United States Patent
Sakata et al.

(12) 
(10) Patent No.: US 6,498,223 B2
(45) Date of Patent: Dec. 24, 2002

(54) UNSATURATED NITRILE-CONJUGATED DIENE-TYPED RUBBER, RUBBER COMPOSITION AND PROCESS FOR THE PRODUCTIONS OF THE SAME

(75) Inventors: Katsuhiko Sakata, Tokyo (JP); Osamu Ishikawa, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/986,900

(22) Filed: Nov. 13, 2001

(65) Prior Publication Data

US 2002/0091189 A1 Jul. 11, 2002

(30) Foreign Application Priority Data

Nov. 13, 2000 (JP) .................................. 2000-345371
Jul. 6, 2001 (JP) .................................. 2001-206602

(51) Int. Cl.$^7$ .............................................. C08F 236/12
(52) U.S. Cl. ...................... 526/338; 526/79; 526/87; 525/192; 525/233; 525/234; 524/555; 524/565; 524/566
(58) Field of Search ................... 526/338, 79, 87; 525/192, 233, 234; 524/555, 565, 566

(56) References Cited

U.S. PATENT DOCUMENTS

| 4,022,957 A | * | 5/1977 | Griffith | .................... | 526/338 X |
| 4,138,389 A | * | 2/1979 | Edwards | .................. | 525/234 X |
| 5,266,640 A | * | 11/1993 | Karg et al. | ................. | 525/234 |
| 5,552,468 A | * | 9/1996 | Ngoc et al. | ............. | 526/338 X |
| 5,770,660 A | * | 6/1998 | Lightsey | .................. | 526/338 X |
| 5,807,941 A | * | 9/1998 | Tsuji et al. | ............. | 526/338 X |

FOREIGN PATENT DOCUMENTS

JP  08-073538  3/1996

* cited by examiner

*Primary Examiner*—Fred Teskin
(74) *Attorney, Agent, or Firm*—Oblon, Spivak, McClelland, Maier & Neustadt, P.C.

(57) ABSTRACT

An objective of the present invention is to provide an unsaturated nitrile-conjugated diene-typed rubber capable of giving a vulcanized rubber which exhibits is well-balanced in terms of the mechanical strength, the oil resistance and the like, as well as a process for the production of the same, and a rubber composition which is containing such rubber and exhibits an excellent processability as well as a process for the production of the same. The unsaturated nitrile-conjugated diene-typed rubber in the invention is produced by polymerizing using certain amounts of an olefinically unsaturated nitrile monomer such as acrylonitrile and a conjugated diene monomer such as butadiene at first, and continuing by supplying a remainder of the monomers at a certain ratio continuously or stepwise to proceed the polymerization. The unsaturated nitrile-conjugated diene-typed rubber is constituted 55 to 80 wt % of an olefinically unsaturated nitrile monomer unit as a repeating unit and 20 to 45 wt % of a conjugated diene monomer unit as a repeating unit based on 100 wt % of total of the monomer units. Glass transition temperature is −15 to 30° C. and the extrapolated temperature of the termination of the glass transition is preferably 70° C. or less.

12 Claims, No Drawings

UNSATURATED NITRILE-CONJUGATED DIENE-TYPED RUBBER, RUBBER COMPOSITION AND PROCESS FOR THE PRODUCTIONS OF THE SAME

FIELD OF THE INVENTION

The present invention relates to an unsaturated nitrile-conjugated diene-typed rubber whose content of an unsaturated nitrile monomer unit is high, a rubber composition containing such rubber and process for the productions of the same. A vulcanized rubber obtained by processing the rubber composition can widely be employed in any application requiring good resistance to oils or the like, including hoses such as oil hoses, fuel hoses, gas hoses, brake hoses and the like, covers of such hoses, as well as industrial parts such as packings, gaskets, O-rings, belts, oil seals and the like, parts of aircrafts, ships, automobiles and the like, tire parts or the like such as tire tubes, inner liners and the like, and other components or the like of paper coatings and adhesives.

DESCRIPTION OF THE RELATED ART

An unsaturated nitrile-conjugated diene-typed rubber such as acrylonitrile-butadiene rubber has an excellent oil resistance or the like and has widely been employed as an industrial material such as building materials, automobile parts and the like. Such unsaturated nitrile-conjugated diene-typed rubber, when blended with a styrene-butadiene rubber, an ethylene-α-olefin-based rubber or a polyvinyl chloride or the like, also gives a composition which can be used to give a rubber or resin product whose oil resistance or the like has been improved.

However, a highly polar unsaturated nitrile-conjugated diene-typed rubber, when blended with a polymer whose polarity is small, tends to undergo a reduction in its mechanical strength or the like. While the content of an unsaturated nitrile-conjugated diene-typed rubber required for obtaining a composition having a desired physical property is determined based mainly on the content of the unsaturated nitrile monomer unit, an ordinary product has the unsaturated nitrile monomer unit whose content is not more than about 50 wt % in view of the difference or the like in the reactivity between an unsaturated nitrile and a conjugated diene. Accordingly, a sufficient improvement in the oil resistance or the like of various rubber products or resin products requires a use of a rubber composition containing a large amount of an unsaturated nitrile-conjugated diene-typed rubber, which leads to a problematic reduction in the weather resistance although a resultant product has an improved oil resistance or the like.

As described above, a problematic limitation to the blending ratio between an unsaturated nitrile-conjugated diene-typed rubber and a polymer having especially small polarity is encountered in an attempt to obtain a product having a desirable physical property. An unsaturated nitrile-conjugated diene-typed rubber capable of giving a vulcanized rubber which is well-balanced in terms of various physical characteristics such as the mechanical strength, the oil resistance, the weather resistance, the gas barrier performance and the like, has not been provided yet.

SUMMARY OF THE INVENTION

The present invention is intended to solve the problems described above and thus its objective is to provide an unsaturated nitrile-conjugated diene-typed rubber capable of giving a vulcanized rubber which is well-balanced in terms of the mechanical strength, the oil resistance, the weather resistance, the gas barrier performance and the like, as well as a process for the production of the same, and a rubber composition comprising such unsaturated nitrile-conjugated diene-typed rubber capable of giving a vulcanized rubber which exhibits an excellent processability and preserves the excellent physical characteristics and also has a sufficient flexibility, as well as a process for the production of the same.

The invention is described below.

1. An unsaturated nitrile-conjugated diene-based rubber comprising 55 to 80 wt % of (A) an olefinically unsaturated nitrile monomer unit as a repeating unit and 20 to 45 wt % of (B) a conjugated diene monomer unit as a repeating unit based on 100 wt % of total of the above-mentioned monomer unit (A) and the above-mentioned monomer unit (B), and whose glass transition temperature of the above-mentioned unsaturated nitrile-conjugated diene-based rubber is −15 to 30° C.

2. The unsaturated nitrile-conjugated diene-based rubber according to 1 above wherein weight-average molecular weight of the above-mentioned unsaturated nitrile-conjugated diene-based rubber is 30,000 or more.

3. The unsaturated nitrile-conjugated diene-based rubber according to 1 above wherein the content of the above-mentioned monomer unit (A) is exceeding 60 wt %.

4. A process for the production of an unsaturated nitrile-conjugated diene-based rubber which is constituted of 55 to 80 wt % of (A) an olefinically unsaturated nitrile monomer unit as a repeating unit and 20 to 45 wt % of (B) a conjugated diene monomer unit as a repeating unit based on 100 wt % of total of the above-mentioned monomer unit (A) and the above-mentioned monomer unit (B), and whose glass transition temperature of the above-mentioned unsaturated nitrile-conjugated diene-based rubber is −15 to 30° C., comprising:

a first step for polymerizing using (a) an olefinically unsaturated nitrile monomer in an amount of 60 to 85 wt % and (b) a conjugated diene monomer in an amount of 3 to 10 wt % based on 100 wt % of total of the above-mentioned monomer (a) and the above-mentioned monomer (b) to be supplied, a second step for continuing polymerization by supplying continuously the above-mentioned monomer (b) in an amount of 50 wt % or more and the above-mentioned monomer (a) in an amount of 50 wt % or less based on 100 wt % of total of remainder of monomers.

5. A process for the production of an unsaturated nitrile-conjugated diene-based rubber which is constituted of 55 to 80 wt % of (A) an olefinically unsaturated nitrile monomer unit as a repeating unit and 20 to 45 wt % of (B) a conjugated diene monomer unit as a repeating unit based on 100 wt % of total of the above-mentioned monomer unit (A) and the above-mentioned monomer unit (B), and whose glass transition temperature of the above-mentioned unsaturated nitrile-conjugated diene-based rubber is −15 to 30° C., comprising:

a first step for polymerizing using (a) an olefinically unsaturated nitrile monomer in an amount of 60 to 85 wt % and (b) a conjugated diene monomer in an amount of 3 to 10 wt % based on 100 wt % of total of the above-mentioned monomer (a) and the above-mentioned monomer (b) to be supplied, a second step for continuing polymerization by supplying total of remainder of monomers stepwise by the above-mentioned monomer (b) in an amount of 50 wt % or more and the above-mentioned monomer (a) in an amount of 50 wt % or less based on 100 wt % of monomers to be supplied in each step.

6. A rubber composition comprising two kinds of unsaturated nitrile-conjugated diene-based rubbers which are constituted of 55 to 80 wt % of (A) an olefinically unsaturated nitrile monomer unit as a repeating unit and 20 to 45 wt % of (B) a conjugated diene monomer unit as a repeating unit based on 100 wt % of total of the above-mentioned monomer unit (A) and the above-mentioned monomer unit (B), whose glass transition temperature of the above-mentioned unsaturated nitrile-conjugated diene-based rubbers are −15 to 30° C., and one of which is a high molecular weight rubber whose weight-average molecular weight is 30,000 or more and the other of which is a low molecular weight rubber whose weight-average molecular weight is less than 30,000.

7. The rubber composition according to 6 above further comprising at least one of reinforcing agents selected from the group consisting of silica, aluminium hydroxide and carbon black.

8. The rubber composition according to 6 above wherein the above-mentioned high molecular weight rubber is in an amount of 40 to 95 wt % and the above-mentioned low molecular weight rubber is in an amount of 5 to 60 wt % based on 100 wt % of the total of the above-mentioned high molecular weight rubber and the above-mentioned low molecular weight rubber.

9. The rubber composition according to 8 above wherein the above-mentioned weight-average molecular weight of the above-mentioned high molecular weight rubber is 50,000 to 700,000 and the above-mentioned weight-average molecular rubber of the above-mentioned low molecular weight rubber is 1,000 to 20,000.

10. The rubber composition according to 9 above further comprising at least one of reinforcing agents selected from the group consisting of silica, aluminium hydroxide and carbon black.

11. The rubber composition according to 6 above wherein the content of the above-mentioned olefinically unsaturated nitrile monomer unit (A) is 40 to 80 wt % based on 100% of total of rubber components contained in the above-mentioned rubber composition.

12. The rubber composition according to 11 above further comprising at least one of reinforcing agents selected from the group consisting of silica, aluminium hydroxide and carbon black.

13. A process for the production of a rubber composition comprising:

a first step for preparing a kneaded material by kneading a formulation (I) containing the above-mentioned unsaturated nitrile-conjugated diene-based rubber which is constituted of 55 to 80 wt % of (A) an olefinically unsaturated nitrile monomer unit as a repeating unit and 20 to 45 wt % of (B) a conjugated diene monomer unit as a repeating unit based on 100 wt % of total of the above-mentioned monomer unit (A) and the above-mentioned monomer unit (B), whose glass transition temperature of the above-mentioned unsaturated nitrile-conjugated diene-based rubber is −15 to 30° C., and a second step for kneading a formulation (II) containing the above-mentioned kneaded material and a vulcanizing agent.

14. The process for the production of a rubber composition according to 13 above wherein the above-mentioned unsaturated nitrile-conjugated diene-based rubber are the ones which are a high molecular weight rubber whose weight-average molecular weight is 30,000 or more and a low molecular weight rubber whose weight-average molecular weight is less than 30,000.

According to the unsaturated nitrile-conjugated diene-typed rubber in the invention, a rubber composition having a sufficient processability and a vulcanized rubber which is well-balanced in terms of the mechanical strength, the oil resistance, the weather resistance, the gas barrier performance and the like, can be obtained. Especially when the weight-average molecular weight of the unsaturated nitrile-conjugated diene-typed rubber is 30,000 or more, a vulcanized rubber which is further excellent in terms of the mechanical strength, the oil resistance, the gas barrier performance and the like, can be obtained. When the content of (A) an olefinically unsaturated nitrile monomer unit is present in an amount exceeding 60 wt %, a vulcanized rubber having especially excellent oil resistance and gas barrier performance can be obtained.

And according to the process for the production of the unsaturated nitrile-conjugated diene-typed rubber in the invention, the unsaturated nitrile-conjugated diene-typed rubber described above can readily be produced by means of simple and convenient device and procedure.

Also according to the rubber composition in the invention, a vulcanized rubber whose mechanical strength, oil resistance, gas barrier performance and the like, are well-balanced with its flexibility can be obtained because of containing the unsaturated nitrile-conjugated diene-typed rubber described above. In addition, according to another rubber composition in the invention, a more flexible vulcanized rubber which preserves its excellent oil resistance and gas barrier performance can be obtained. Especially when the weight-average molecular weight of a high molecular weight unsaturated nitrile-conjugated diene-typed rubber is 50,000 to 700,000 and the weight-average molecular weight of a low molecular weight rubber is 1,000 to 20,000, a vulcanized rubber whose oil resistance and gas barrier performance are well-balanced with flexibility can be obtained. When the high molecular weight rubber is present in an amount of 60 to 95 wt % and the low molecular weight rubber is present in an amount of 5 to 40 wt %, it is further ensured that a vulcanized rubber having excellent oil resistance and gas barrier performance together with a sufficient flexibility can be obtained. Also when a rubber composition is constituted of the olefinically unsaturated nitrile monomer unit (A) whose content is 40 to 80 wt % based on 100 wt % of the total of the rubber components, a vulcanized rubber having an excellent mechanical strength, sufficient oil resistance, gas barrier performance and the like, can be obtained.

Also according to the process for the production of the rubber composition in the invention, a rubber composition giving a vulcanized rubber whose mechanical strength, oil resistance, gas barrier performance and the like are excellent and which also has a sufficient flexibility can readily be produced.

DETAILED DESCRIPTION OF THE INVENTION

The term "unsaturated nitrile-conjugated diene-typed rubbers (hereinafter referred to as "NBR-typed rubber") in the invention means a random copolymer produced by copolymerizing monomers containing (a) an olefinically unsaturated nitrile monomer (hereinafter referred to as "Monomer (a)") and (b) a conjugated diene monomer (hereinafter referred to as "Monomer (b)").

Monomer (a) may be used acrylonitrile, methacrylonitrile and the like. Any of these Monomers (a) may be used alone or in combination of two or more.

Monomer (b) may be used 1,3-butadiene, isoprene, 2,3-dimethyl-1,3-butadiene, chloroprene and the like. Any of these Monomers (b) may be used alone or in combination of two or more.

The content of the olefinically unsaturated nitrile monomer unit (A) formed by Monomer (a) is 55 to 80 wt %, preferably 55 to 75 wt % based on 100 wt % of the total of the monomer unit (A) and the conjugated diene monomer unit (B) formed by Monomer (b) in view of the repeating unit constituting the NBR-typed rubber. The content of the monomer unit (A) less than 55 wt % results in a requirement of a large amount of the NBR-typed rubber to be blended with other polymer for improving the oil resistance or the like of a rubber product, and leads to a reduction in the weather resistance or the like. If the other polymer has a small polarity, the mechanical strength of the rubber product obtained is also reduced. On the other hand, a polymer whose content of the monomer unit (A) is exceeding 80 wt % will form a resin rather than a rubber, and exhibit an extremely low producibility and which is not subjected usually by an industrial production. Even when the polymerization is effected for example at an elevated temperature or the like, a polymer in which the monomer unit (A) formed by Monomer (a) is contained at an extremely high level is deposited, and the polymerization may sometimes be terminated. In addition, an uneven polymer is obtained and can not be employed practically.

The content of the monomer unit (A) is preferably exceeding 60 wt %, more preferably 61 wt % or more, most preferably 65 wt % or more. In each case, the upper limit of the content is preferably 80 wt %, particularly 75 wt %. In the case a composition is prepared by incorporations the NBR-typed rubber having a highly-contained monomer unit (A) as described above with other type of NBR-typed rubber, a rubber of other type or a resin, a vulcanized rubber produced by using the composition can improve the mechanical strength, the oil resistance, the gas barrier performance and the like even when being present only in a small amount. Accordingly, the physical properties which rubber or resin to be incorporated originally had are not fortunately impaired.

The content of the monomer unit (B) is 20 to 45 wt %, preferably 40 wt % or less, most preferably 35 wt % or less based on 100 wt % of the total of the monomer unit (A) and the monomer unit (B). The content of the monomer unit (B) less than the lower limit or exceeding the upper limit specified above, a problem encountered when the content of the monomer unit (A) exceeds the upper limit or is less than the lower limit is experienced similarly.

The NBR-typed rubber in the invention may be the one produced by copolymerizing various monomers if necessary in addition to Monomers (a) and (b).

Such additional monomer may be used an aromatic vinyl monomer, a (meth)acrylate-based monomer such as alkyl (meth)acrylate-based monomer and the like. The monomer described above may be the one having at least one of the functional groups selected from the group consisting of amino group, hydroxyl group, epoxy group and carboxyl group.

An aromatic vinyl monomer may be used styrene, 2-methylstyrene, 3-methylstyrene, 4-methylstyrene, α-methylstyrene, 2,4-dimethylstyrene, 2,4-diisopropylstyrene, 4-t-butylstyrene, t-butoxystyrene and the like.

An amino group-containing aromatic vinyl monomer may be used a tertiary amino group-containing aromatic vinyl compound such as N,N-dimethyl-p-aminostyrene, N,N-diethyl-p-aminostyrene, dimethyl (p-vinylbenzyl)amine, diethyl (p-vinylbenzyl)amine, dimethyl (p-vinylphenethyl) amine, diethyl (p-vinylphenethyl)amine, dimethyl (p-vinylbenzyloxymethyl)amine, dimethyl [2-(p-vinylbenzyloxy)ethyl]amine, diethyl [(p-vinylbenzyloxy) methyl]amine, diethyl [2-(p-vinylbenzyloxy)ethyl]amine, dimethyl (p-vinylphenethyloxymethyl)amine, dimethyl [2-(p-vinylphenethyloxy)ethyl]amine, diethyl (p-vinylphenethyloxymethyl)amine, diethyl [2-(p-vinylphenethyloxy)ethyl]amine, 2-vinylpyridine, 3-vinylpyridine, 4-vinylpyridine and the like.

A hydroxyl group-containing aromatic vinyl monomer may be used o-hydroxystyrene, m-hydroxystyrene, p-hydroxystyrene, o-hydroxy-α-methylstyrene, m-hydroxy-α-methylstyrene, p-hydroxy-α-methylstyrene, p-vinylbenzyl alcohol and the like.

An alkyl (meth)acrylate-based monomer may be used methyl (meth)acrylate, ethyl (meth)acrylate, n-propyl (meth)acrylate, iso-propyl (meth)acrylate, n-butyl (meth) acrylate, n-amyl (meth)acrylate, n-hexyl (meth)acrylate, 2-ethylhexyl (meth)acrylate, cyclohexyl (meth)acrylate and the like.

An amino group-containing (meth)acrylate-based monomer may be used dimethylaminomethyl (meth)acrylate, diethylaminomethyl (meth)acrylate, 2-dimethylaminoethyl (meth)acrylate, 2-diethylaminoethyl (meth)acrylate, 2-(di-n-propylamino)ethyl (meth)acrylate, 2-dimethylaminopropyl (meth)acrylate, 2-diethylaminopropyl (meth)acrylate, 2-(di-n-propylamino)propyl (meth)acrylate, 3-dimethylaminopropyl (meth)acrylate, 3-diethylaminopropyl (meth)acrylate, 3-(di-n-propylamino) propyl (meth)acrylate and the like.

A hydroxyl group-containing (meth)acrylate-based monomer may be used a hydroxyalkyl (meth)acrylate such as 2-hydroxyethyl (meth)acrylate, 2-hydroxypropyl (meth) acrylate, 3-hydroxypropyl (meth)acrylate, 2-hydroxybutyl (meth)acrylate, 3-hydroxybutyl (meth)acrylate, 4-hydroxybutyl (meth)acrylate and the like, as well as a mono(meth)acrylate or the like of a polyalkylene glycol (the number of alkylene glycol units may for example be 2 to 23) such as polyethylene glycol, polypropylene glycol and the like.

An epoxy group-containing (meth)acrylate-based monomer may be used glycidyl (meth)acrylate, 3,4-oxycyclohexyl (meth)acrylate and the like.

A carboxyl group-containing (meth)acrylate-based monomer may be used an unsaturated carboxylic acid such as (meth)acrylic acid, maleic acid, fumaric acid, itaconic acid, tetraconic acid, cinnamic acid and the like, and their salts or the like, and a free carboxylic group-containing ester such as mono-ester or the like of a non-polymerizable polyvalent carboxylic acid such as phthalic acid, succinic acid, adipic acid and the like with a hydroxyl group-containing unsaturated compound such as (meth)allyl alcohol, 2-hydroxyethyl (meth)acrylate and the like, and their salts or the like.

Any of these other monomers may be used alone or in combination of two or more.

While any of these other monomers described above may be employed in an amount by which the characteristics of the NBR-typed rubber in the invention are not affected adversely, it is preferably employed usually in an amount of 20 parts by mass (hereinafter, referred to as parts) or less, particularly 10 parts or less based on 100 parts of the total of Monomer (a) and Monomer (b).

"Glass transition temperature" of the NBR-typed rubber may vary depending on the composition of the monomers employed. It is in the range of between −15 and 30° C., preferably −15 and 20° C., especially −10 and 20° C. determined using a differential scanning calorimeter (DSC) in accordance with ASTM D3418-82 (reapproved in 1988). The extrapolated temperature of the termination of the glass transition is preferably 70° C. or lower, especially 50° C. or lower. The extrapolated temperature of the termination of the glass transition exceeding 70° C. means that the content of the monomer unit (A) formed by Monomer (a) is extremely high and that a rubber component whose glass transition temperature exceeding 70° C. is contained, thus the NBR-typed rubber will be uneven.

The weight-average molecular weight of the NBR-typed rubber is not particularly limited. For the purpose of obtaining a vulcanized rubber having excellent mechanical strength, oil resistance and the like, it is preferably 30,000 or more, particularly 30,000 to 1,000,000, more preferably 50,000 to 700,000 represented as polystyrene determined by a gel permeation chromatography (GPC). Especially 70,000 to 500,000 of the weight-average molecular weight of the NBR-typed rubber gives a vulcanized rubber having sufficient processability, strength and the like.

The weight-average molecular weight of the NBR-typed rubber may be lower, however, in the case a composition is prepared by incorporating a low molecular weight NBR-typed rubber with a high molecular weight NBR-typed rubber or a rubber of other type or a resin, a vulcanized rubber produced by using the composition is the one having excellent mechanical strength, gas barrier performance and the like in combination with a low hardness and a high flexibility. The low molecular weight rubber useful as a rubber/resin modifier as described above may be a liquid rubber whose weight-average molecular weight is 1,000 to 20,000, especially 2,000 to 10,000.

The process for the production of the NBR-typed rubber in the invention is followed in detail, which serves only as an example and is not intended to restrict the invention.

The process for the production of the NBR-typed rubber in the invention in not particularly limited. It is usually preferred to employ an emulsion polymerization. The NBR-typed rubber can be produced by polymerizing Monomers (a) and (b) if necessary with other monomers in an aqueous medium in the presence of a radical polymerization initiator, and which may be produced either in a continuous or batch system. In the emulsion polymerization, a part of each monomer to be employed is emulsified in an aqueous medium in the presence of an emulsifier, and the first step of polymerization is initiated in the presence of the radical polymerization initiator. Once an increase in the polymerization conversion or a polymerization heat generation or the like in the first step of polymerization is ensured, the remainder of the monomers is supplied continuously. Or once the first step of polymerization reached a predetermined polymerization conversion, the remainder of the monomers is added stepwise as a bulk, and thereafter the second step or second and further steps of the polymerization are proceeded until the termination of the polymerization using a polymerization terminator.

In the first step of polymerization, 60 to 85 wt % of Monomer (a) and 3 to 10 wt % of Monomer (b) are employed based on 100 wt % of the total of Monomer (a) and Monomer (b) to be employed. The amount of Monomer (a) exceeding 85 wt % or Monomer (b) less than 3 wt % results in the depletion of Monomer (b) before reaching the predetermined polymerization conversion, which may lead to the termination of the polymerization. On the other hand, the amount of Monomer (a) less than 60 wt % or Monomer (b) exceeding 10 wt % leads to a resultant NBR-typed rubber in which the monomer unit (A) formed by Monomer (a) is present in an amount less than 55 wt %.

In the case the second step of polymerization is performed by supplying the remainder of the monomers continuously after initiating the first step of polymerization, when the polymerization conversion or a polymerization heat generation or the like in the first step of polymerization is ensured, all of the remainder of the monomers is supplied continuously to proceed polymerization. The polymerization is terminated usually at polymerization conversion of 50 to 80%. In this second step of polymerization, Monomer (b) in an amount of 50 wt % or more and Monomer (a) in an amount of 50 wt % or less based on 100 wt % of the remainder of the monomers are supplied to polymerization system. 100 wt % of Monomer (b) may be employed. It is preferably to employ Monomer (b) in an amount of 55 to 80 wt % and Monomer (a) in an amount of 20 to 45 wt %, more preferably Monomer (b) in an amount of 60 to 80 wt % and Monomer (a) in an amount of 20 to 40 wt %. Smaller amount of Monomer (b) to be supplied results in the depletion of Monomer (b) before reaching the predetermined polymerization conversion, which may lead to the termination of the polymerization. In this procedure, Monomer (a) and Monomer (b) may previously be mixed with each other before being supplied, or each may be supplied from independent vessel and the like.

In the case the second and further steps of polymerization is performed by supplying the remainder of the monomers stepwise after initiating the first step of polymerization, when a third-step polymerization is employed for example, the polymerization conversion of the first step of polymerization is allowed to reach 10 to 30%, preferably 15 to 25% and then a part of the remainder of the monomers is supplied as a bulk to effect the second step polymerization, and subsequently the polymerization conversion is allowed to exceed 30% and 50% or less, preferably allowed to reach 35 to 45% and then all of the remainder of the monomers is supplied as a bulk to effect the third step polymerization. The polymerization is terminated usually when the polymerization conversion reaches 50 to 80%. When a four-step polymerization is employed, the polymerization conversions of the first, second and third step of polymerizations are allowed to reach 10 to 20%, 25 to 35% and 40 to 45%, respectively, and then the remainder of the monomers is supplied sequentially to proceed the polymerization. The polymerization is terminated when the polymerization conversion reaches 50 to 80%. As described above, a multistep of polymerization can be employed, and is rather preferred for the purpose of controlling each content of monomer unit constituting the NBR-base rubber.

In the multistep of polymerization, the remainder of the monomers is supplied Monomer (b) in an amount of 50 wt % or more and Monomer (a) in an amount of 50 wt % or less based on 100 wt % of the remainder of the monomers to be supplied in each step as a bulk to polymerization system. 100 wt % of Monomer (b) may be employed. It is preferably to employ Monomer (b) in an amount of 55 to 80 wt % and Monomer (a) in an amount of 20 to 45 wt %, more preferably Monomer (b) in an amount of 60 to 80 wt % and Monomer (a) in an amount of 20 to 40 wt % in each step. Smaller amount of Monomer (b) to be supplied results in the depletion of Monomer (b) before reaching the predetermined polymerization conversion, which may lead to the termination of the polymerization. In this procedure, Monomer (a) and Monomer (b) to be supplied in each step may previously be mixed with each other, or each may be supplied from independent vessel and the like.

The respective values indicated above with regard to the polymerization conversion in each step and the final polymerization conversion in the third and fourth steps of the polymerization and also with regard to the amount of the monomer to be supplied as a bulk in each step are given only as examples, and not intended to be limitative.

The emulsifier in the emulsion polymerization may be an anionic surfactant, a nonionic surfactant, a cationic surfactant, an amphoteric surfactant and the like. A fluorine-based surfactant may also be employed. Any of these emulsifiers may be used alone or in combination of two or more. Those employed frequently as such emulsifiers are anionic surfactants, including, rosin acid salts, as well as potassium or sodium salts or the like of a long chain fatty acid having 10 or more carbon atoms, such as capric acid, lauric acid, myristic acid, palmitic acid, oleic acid, stearic acid and the like.

The radical polymerization initiator in the emulsion polymerization may be an organic peroxide such as p-menthane hydroperoxide, benzoyl peroxide, lauroyl peroxide, t-butyl hydroperoxide, cumene hydroperoxide, di-t-butyl Peroxide, dicumyl peroxide and the like. An azo compound such as azobisisobutyronitrile, an inorganic peroxide such as potassium persulfate, a combination of such peroxide with ferrous sulfate, a redox catalyst such as a combination of a peroxide and ferrous sulfate with a reducing agent such as sodium formaldehyde sulfoxylate, and the like may also be employed. Any of these radical polymerization initiators may be used alone or in combination of two or more.

Also in order to control the molecular weight of the NBR-typed rubber, a chain transfer agent such as an alkylmercaptan including t-dodecylmercaptan and n-dodecylmercaptan, carbon tetrachloride, thioglycols, diterpene, terpinolene, α-terpinens and the like may also be employed.

A polymerization can be performed using an oxygen-free reaction vessel at a temperature of 0 to 100° C., and the polymerization temperature is preferably 0 to 80° C., particularly 0 to 50° C. Operation conditions such as the polymerization temperature and the stirring mode, may appropriately be changed during the course of the reaction. Since a higher polymerization conversion may lead to a formation of a rubber component in which the monomer unit (A) formed by Monomer (a) is present in an extremely large amount, the polymerization conversion is preferred to be kept at about 80% or less as described above. The polymerization may be terminated by adding a polymerization terminator such as an amine compound including hydroxylamine, diethylhydroxylamine or a quinone compound such as hydroquinone or the like at the time point when a predetermined polymerization conversion is achieved.

After terminating the polymerization, a resultant NBR-typed rubber latex may be made free of any unreacted monomers if necessary for example by a steam stripping or the like, and then combined with a salt such as sodium chloride, potassium chloride, calcium chloride, if necessary together with hydrochloric acid, nitric acid, sulfuric acid and the like, whereby aggregating a rubber composition as crumb. This crumb is then washed, dewatered and dried for example by a drier or the like to obtain an NBR-typed rubber in the invention.

A rubber composition containing the NBR-typed rubber described above and a process for the production of the same are detailed below.

The rubber composition in the invention is containing two kinds of the NBR-typed rubbers described above, one of which is a high molecular weight rubber whose weight-average molecular weight is 30,000 or higher and the other of which is a low molecular weight rubber whose weight-average molecular weight is less than 30,000. The content of the olefinic unsaturated nitrile monomer unit (A) of the specific NBR-typed rubber to be incorporated is preferably 55 to 80 wt %, more preferably 60 to 80 wt %.

The weight-average molecular weight of the high molecular weight rubber constituting the rubber composition in the invention is preferably 50,000 to 700,000, especially 70,000 to 500,000, while that of the low molecular weight rubber is preferably 1,000 to 20,000, especially 2,000 to 10,000. Such high molecular weight rubber and low molecular weight rubber whose molecular weights are within the respective suitable ranges may appropriately be combined, a combination of a high molecular weight rubber whose weight-average molecular weight is 50,000 to 700,000 and a low molecular weight rubber whose weight-average molecular weight is 1,000 to 20,000 is preferred especially. A vulcanized rubber produced using the rubber composition containing well-combined NBR-typed rubber having different molecular weights shows that excellent mechanical strength, oil resistance, gas barrier performance and the like are preserved and whose hardness is sufficiently reduced. And it is practically useful.

In the rubber composition containing two kinds of the NBR-typed rubbers described above, the high molecular weight rubber is preferably present in an amount of 40 to 95 wt % and the low molecular weight rubber is preferably present in an amount of 5 to 60 wt % based on 100% of the total of the high molecular weight rubber and the low molecular weight rubber. The high molecular weight rubber in an amount exceeding 95 wt %, i.e., the low molecular weight rubber in an amount less than 5 wt %, results in an undesirably higher hardness of a vulcanized rubber although it retains excellent mechanical strength, oil resistance, gas barrier performance and the like. On the other hand, the high molecular weight rubber in an amount less than 40 wt %, i.e., the low molecular weight rubber in an amount exceeding 60 wt %, may lead to a reduction in the mechanical strength, the oil resistance, and the like, although a sufficiently flexible vulcanized rubber can be obtained. The amounts of the high molecular weight rubber and the low molecular weight rubber are 70 to 90 wt % and 10 to 30 wt %, respectively. Any amounts within which ranges can give a vulcanized rubber having excellent mechanical strength, oil resistance, gas barrier performance and the like, together with a sufficient flexibility.

The rubber composition may be the one incorporating the other rubber in addition to the NBR-typed rubber described above. The other rubber may be a NBR-typed rubber except for the specific NBR-typed rubber described above as well as that described below.

The other rubber capable of incorporating with the NBR-typed rubber described above may be used halogenated ethylene-propylene-diene rubbers, halogenated butyl rubbers, a chloroprene rubber, halogen-containing acrylic rubbers, a butyl rubber, an ethylene-propylene rubber, an ethylene-propylene-diene rubber, a styrene-butadiene rubber, a butadiene rubber, a isoprene rubber, a butadiene-isoprene rubber, a butadiene-styrene-isoprene rubber, a natural rubber and the like.

Among these rubbers listed above, one having a halogen atom bound to its backbone or a one having a halogen atom-carrying functional group bound thereto, such as halogenated ethylene-propylene-diene rubbers, halogenated butyl rubbers, a chloroprene rubber, is preferred because it is vulcanized readily. Any of these other rubbers may be used alone or in combination of two or more.

In the case of employing the NBR-typed rubber described above and the other rubbers, the amount of the NBR-typed rubber described above is preferably 200 parts or less, more preferably 150 parts or less, most preferably 120 parts or less based on 100 parts of the other rubbers. The smaller amount of the NBR-typed rubber may lead to an insufficient improvement in the oil resistance, the gas barrier performance and the like of a vulcanized rubber produced. On the other hand, the NBR-typed rubber exceeding 200 parts may lead to a reduced weather resistance of the vulcanized rubber to be produced. If the other rubbers have small polarities especially, sometimes leads to a reduced mechanical strength with the vulcanized rubber.

The content of the olefinic unsaturated nitrile monomer unit (A) is preferably 40 to 80 wt %, more preferably 50 to 80 wt %, most preferably 60 to 80 wt % based on 100 wt % of the total of the rubber components contained the rubber composition. The content less than 40 wt % is not preferred since it is unsuccessful in improving the mechanical strength, the oil resistance, the gas barrier performance and the like of the vulcanized rubber to be produced, sufficiently in spite of the incorporation of the NBR-typed rubber.

The rubber composition in the invention may also contain a resin. The resin capable of incorporating to the rubber composition may be used polyvinyl chloride, chlorosulfonated polyethylenes, polyamides, polyvinyl alcohols, ethylene-vinyl alcohol copolymers and the like. Among these, vinyl chloride is preferred. Any of these resins may be used alone or in combination of two or more. The amount of the resin to be incorporated is preferably the same as the other rubber described above.

The vulcanized rubber formed by using the rubber composition according to the invention shows excellent mechanical strength, oil resistance and the like, as well as a sufficient gas barrier performance. And the rubber composition can widely be employed in various applications, and it can suppress the gas permeation sufficiently regardless of the types of specified gases handled in respective applications. Such gases are air, nitrogen, oxygen, carbon dioxide, carbon monooxide, methane, ethane, propane and the like.

The rubber composition in the invention are generally incorporated a reinforcing agent, a vulcanizing agent and the like.

The reinforcing agent may be used an inorganic filler such as silica, aluminium hydroxide and the like, carbon black, carbon-silica dual phase filler and the like. The silica is not limited particularly, it may be any one employed usually as a light color reinforcing agent for synthetic rubbers. While the type of a silica is not particularly limited, a wet process type white carbon, a dry process type white carbon, a colloidal silica and a precipitated silica and the like described in Japanese Patent laid-open publication Sho 62-62838 can be employed. Any of the inorganic filler may be used in combination of two or more and may be combined with a different type of the inorganic filler. The amount of the inorganic filler to be incorporated is 10 to 150 parts, preferably 20 to 100 parts based on 100 parts of the total of the rubber components. The amount of the inorganic filler less than 10 parts may lead to an insufficient reinforcing effect. On the other hand, the amount of 150 parts is enough for obtaining a sufficient reinforcing effect, and no further amount is required.

The carbon black is not limited particularly, it may be used a furnace black, an acetylene black, a thermal black, a channel black, a graphite and the like. Among those listed above, the furnace black is preferred. These carbon black may be used alone or in combination of two or more. The amount of the carbon black to be incorporated is preferably 5 to 100 parts, particularly 20 to 80 parts based on 100 parts of the total of the rubber components. The reinforcing agent listed above may be employed alone or in combination of two or more.

While the representative vulcanizing agent is a sulfur, and sulfur-containing compounds, peroxides or the like may also be employed. Any of these vulcanizing agents may be used alone or in combination of two or more and may be combined with a different type of the vulcanizing agent. The amount of the vulcanizing agent to be incorporated is usually 0.5 to 10 parts, preferably 1 to 6 parts based on 100 parts of the total of the rubber components.

The following components may be employed in addition to the other rubbers, the reinforcing agents and the vulcanizing agents described above in the rubber composition according to the invention.

Fillers which may be employed are clays, calcium carbonate, magnesium carbonate and the like. Such filler is preferably present in an amount of 5 to 300 parts, especially 20 to 200 parts based on 100 parts of the total of the rubber components. In addition, a naphthene-based, a paraffin-based or an aromatic-based extending oil for a rubber can be incorporated. The extending oil is preferably incorporated in an amount of 5 to 250 parts, especially 10 to 150 parts based on 100 parts of the total of the rubber components. A plasticizer such as phthalic acid-based, adipic acid-based or the like may also be incorporated. The plasticizer is incorporated preferably in an amount of 5 to 100 parts, especially 10 to 50 parts based on 100 parts of the total of the rubber components.

A vulcanization accelerator such as aldehyde ammonia-based, guanidine-based, thiourea-based, thiazole-based or dithiocarbamic acid-based or the like may be employed, and is incorporated preferably in an amount of 0.5 to 15 parts, especially 1 to 10 parts based on 100 parts of the total of the rubber components.

Any of these fillers, extending oils, vulcanization accelerators and the like may be used alone or in combination of two or more and may be combined with a different type of the respective additive.

Furthermore, a zinc oxide, a vulcanization aid, an anti-aging agent or a processing aid or the like may also be incorporated in an appropriate amount.

The rubber composition in the invention and a rubber product obtained therefrom by a vulcanization can be produced as described below.

First, a formulation (I) comprising a rubber component containing the specific NBR-typed rubber described above, a reinforcing agent such as a silica, a carbon black, a carbon-silica dual phase filler and the like, optionally with other additives or the like such as an extending oil or the like for a rubber if necessary are kneaded using a kneader such as a Banbury mixer or the like at a temperature of 10 to 200° C. and a kneaded material is obtained. Subsequently, the kneaded material is cooled if necessary and a formulation (II) supplemented with a vulcanizing agent such as a sulfur or the like, a vulcanization accelerator or the like is further kneaded using a Banbury mixer, a mixing roll and the like at a temperature of 60 to 130° C., and an intended rubber composition is obtained. Then the resultant rubber composition is molded into a desired shape, which is then subjected for example to a vulcanization press, where a vulcanization is effected at a temperature of 140 to 180° C. for 10 to 30 minutes to obtain a desired vulcanized rubber, i.e., a rubber product.

DESCRIPTION OF THE PREFERRED EMBODIMENTS

The present invention is further described in detail in the following Examples. In the following description, the terms "part" and "%" are based on weight, otherwise specified.

[1] PRODUCTION OF NBR-TYPED RUBBERS

PRODUCTION EXAMPLE 1 [NBR ①]

A polymerization vessel was charged with 200 parts of water, 4.5 parts of a rosin acid soap, 8 parts of butadiene and 68 parts of acrylonitrile. Subsequently, the temperature of the polymerization vessel was set at 15° C., and 0.2 part of p-menthane hydroperoxide as a radical polymerization initiator, 0.04 part of sodium ethylene diamine tetraacetate, 0.02 part of ferrous sulfate heptahydrate, 0.07 part of sodium formaldehyde sulfoxylate and 1 part of dodecylmercaptan were added and the polymerization was initiated. At the time point when the polymerization conversion reached 20%, 7 parts of butadiene and 5 parts of acrylonitrile were added and the polymerization was proceeded. Thereafter at the time point when the polymerization conversion reached 40%, 7 parts of butadiene and 5 parts of acrylonitrile were added, and the polymerization was proceeded, and then at the time point when the polymerization conversion reached 60% diethylhydroxylamine was added to terminate the polymerization.

Subsequently, any unreacted monomers were recovered by a steam stripping, and an NBR-typed rubber latex was obtained. Then this latex was aggregated by a salting out to obtain crumb, which was dried by a hot air blower to obtain an acrylonitrile-butadiene rubber NBR ①.

PRODUCTION EXAMPLE 2 [NBR ②]

A polymerization vessel was charged with 200 parts of water, 4.5 parts of a rosin acid soap, 5 parts of butadiene and 75 parts of acrylonitrile. Subsequently, the temperature of the polymerization vessel was set at 15° C., and 0.2 part of p-menthane hydroperoxide as a radical polymerization initiator, 0.04 part of sodium ethylene diamine tetraacetate, 0.02 part of ferrous sulfate heptahydrate, 0.07 part of sodium formaldehyde sulfoxylate and 1 part of dodecylmercaptan were added and the polymerization was initiated. After initiating the polymerization, 15 parts of butadiene and 5 parts of acrylonitrile were added over a period of 3 hours to proceed the polymerization, and then at the time point when the polymerization conversion reached 60% diethylhydroxylamine was added to terminate the polymerization.

Subsequently, any unreacted monomers were recovered by a steam stripping, and an NBR-typed rubber latex was obtained. Then this latex was aggregated by a salting out to obtain crumb, which was dried by a hot air blower to obtain an acrylonitrile-butadiene rubber NBR ②.

PRODUCTION EXAMPLE 3 [NBR ③]

NBR ③ was obtained similarly to Production Example 1 except for using 9 parts of dodecylmercaptan.

COMPARATIVE PRODUCTION EXAMPLE 1 [NBR ④]

A polymerization vessel was charged with 200 parts of water, 4.5 parts of a rosin acid soap, 30 parts of butadiene and 70 parts of acrylonitrile. Subsequently, the temperature of the polymerization vessel was set at 15° C., and 0.2 part of p-menthane hydroperoxide as a radical polymerization initiator, 0.04 part of sodium ethylene diamine tetraacetate, 0.02 part of ferrous sulfate heptahydrate, 0.07 part of sodium formaldehyde sulfoxylate and 0.7 part of dodecylmercaptan were added and the polymerization was initiated. At the time point when the polymerization conversion reached 60% diethylhydroxylamine was added to terminate the polymerization.

Subsequently, any unreacted monomers were recovered by a steam stripping, and an NBR-typed rubber latex was obtained. Then this latex was aggregated by a salting out to obtain crumb, which was dried by a hot air blower to obtain an acrylonitrile-butadiene rubber NBR ④.

COMPARATIVE PRODUCTION EXAMPLE 2 [NBR ⑤]

NBR ⑤ was obtained similarly to Comparative Production Example 1 except for using 12 parts of dodecylmercaptan.

REFERENCE PRODUCTION EXAMPLE 1

A polymerization vessel was charged with 200 parts of water, 4.5 parts of a rosin acid soap, 20 parts of butadiene and 80 parts of acrylonitrile. Subsequently, the temperature of the polymerization vessel was set at 15° C., and 0.2 part of p-menthane hydroperoxide as a radical polymerization initiator, 0.04 part of sodium ethylene diamine tetraacetate, 0.02 part of ferrous sulfate heptahydrate, 0.07 part of sodium formaldehyde sulfoxylate and 1 part of dodecylmercaptan were added and the polymerization was initiated. Before the polymerization conversion reached 60%, a resultant copolymeric rubber was deposited in the polymerization vessel, thus being unsuccessful in obtaining a stable NBR-typed latex.

REFERENCE PRODUCTION EXAMPLE 2
[Halogen-containing copolymeric rubber (brominated EPDM)]

250 g of EPDM (JSR Corp., Trade name: "EP33") was dissolved in n-hexane, treated dropwise with a solution of bromine in n-hexane (containing 88 g of bromine) at 55 to 60° C. to obtain a brominated EPDM containing 8 wt % of bromine. Bromine content was determined by a fluorescent X-ray method.

Physical characteristics of the NBR-typed rubbers obtained above were determined by the method described below and the result is shown in Table 1.

(a) Bound acrylonitrile content (wt %); A rubber was dissolved in tetrahydrofuran and re-precipitated from methanol, and this procedure was repeated twice to purify the rubber, which was then dried in vacuum, subjected to an elemental analysis to obtain a nitrogen content, from which the bound content was calculated.

(b) Glass transition temperature and extrapolated temperature of the termination of the glass transition (° C.); A glass transition temperature was determined using a differential scanning calorimeter (SEIKO DENSI KOGYO CO., LTD.) in accordance with ASTM D3418-82 (reapproved in 1988). The glass transition temperature were the extrapolated temperatures of the initiation of the glass transition.

(c) Weight-average molecular weight (Mw); A GPC (gel permeation chromatography) was employed and represented as a reduced polystyrene.

TABLE 1

| NBR-based rubber | NBR① | NBR② | NBR③ | NBR④ | NBR⑤ |
|---|---|---|---|---|---|
| Bound acrylonitrile content (wt %) | 61 | 72 | 61 | 50 | 50 |
| Weight-average molecular weight | 110,000 | 90,000 | 8,000 | 190,000 | 9,000 |
| Glass transition temperature (° C.) | 4 | 14 | 4 | −7 | −8 |
| Extrapolated temperature of the termination of the glass transition (° C.) | 15 | 23 | 15 | 2 | 2 |

[2] PREPARATION OF RUBBER COMPOSITION AND VULCANIZED RUBBER AND CHARACTERIZATION

Each of NBR① to ⑤ prepared in Production Examples 1 to 3 and Comparative Production Examples 1 to 2 and the brominated EPDM prepared in Reference Production Example 2 as a rubber component were employed with other auxiliary material below in the amounts shown in Table 2 and Table 3, and the formulation in Table 2 (Examples 1 to 4 and Comparative 1 to 2) and the formulation in Table 3 (Examples 5 to 10 and Comparative 3) were kneaded to produce rubber compositions.

The components incorporated in the formulation are listed below.
1) HAF carbon black; MITSUBISHI CHEMICAL CORP., Trade name: "DIABLACK H"
2) FEF carbon black; TOKAI CARBON CO., LTD., Trade name: "Seast SO"
3) Naphthene-based oil; FUJIKOSAN CO., LTD., Trade name: "FUCOAL FLEX#2050N"
4) Zinc oxide; HAKUSUIKAGAKUKOGYO CO., LTD., Trade name: "No.1"
5) Vulcanization accelerator CBS; OUCHISHINKO CHEMICAL INDUSTRIAL CO., LTD., Trade name: "NOCCELER CZ"
6) Vulcanization accelerator MBT; OUCHISHINKO CHEMICAL INDUSTRIAL CO., LTD., Trade name: "NOCCELER EP-10"
7) Sulfur; TSURUMI CHEMICAL CO., LTD., Trade name: "KINKAJIRUSHI MICROPARTICULATE SULFUR"

At first, the rubber component described above and the mixed auxiliary agents except a vulcanization accelerator and sulfur were charged into the LABOPLASTMILL (TOYO SEIKI CO., LTD.,), and kneaded. Kneading was stopped when temperature of the kneaded material was 140° C. After that, the kneaded material was cooled to about room temperature. The vulcanization accelerator and sulfur were added to the kneaded material and the mixture was further kneaded. When temperature of the kneaded material was 110° C., kneading was stopped. The kneaded material was discharged and the rubber compositions of Examples 1 to 10 and Comparatives 1 to 3 were obtained. Thereafter, each composition was vulcanized using a vulcanization press for 20 minutes at 160° C. to obtain each of the vulcanized rubbers.

Characteristics of the vulcanized rubbers were determined by the methods described below. The results are shown also in Table 2 and Table 3.
(a) Tensile strength (MPa) and elongation (%); A tensile strength and a elongation at break were measured in accordance with JIS K 6301 using No.3 test piece at 25° C. with a tensile speed of 500 mm/minute.
(b) Heat resistance; A change in the hardness before/after being subjected to a hot air degradation at 120° C. for 500 hours (represented as a hardness change point calculated by subtracting the hardness before the deterioration from that after the deterioration) was determined in accordance with JIS K 6257.
(c) Oil resistance (%); An oil resistance was represented as a change percentage in the volume after immersing in IRM903 oil at 120° C. for 70 hours based on the volume before the immersion in accordance with JIS K 6258.
(d) Weather resistance; An ozone resistance was determined in accordance with JIS K 6259. Thus, a test piece was exposed as being extended by 40% to an air containing 50 pphm of ozone at 40° C. for 100 hours and 200 hours, after which the condition of the test piece was evaluated visually.
(e) Hardness; A hardness was determined in accordance with JIS K 6253. Thus, a vulcanized rubber sheet was employed as a test piece, which was measured by a type D durometer at 25 ° C.
(f) Gas barrier performance; A gas permeation coefficient at 40° C. was determined for an air in accordance with JIS K 7126, for carbon dioxide in accordance with JIS Z 0208 and for Fuel C (containing equal volumes of isooctane and toluene) in accordance with ASTM D 814-55. In Table 4, each coefficient was represented as an index based on the reciprocal of a logarithmic value of the permeation coefficient of Comparative 3 for each gas being regarded as 100. A larger index reflects a smaller gas permeation coefficient and a better gas barrier performance.

TABLE 2

|  | Example | | | | Comparative example | |
|---|---|---|---|---|---|---|
|  | 1 | 2 | 3 | 4 | 1 | 2 |
| Raw material (wt %) | | | | | | |
| Rubber component | | | | | | |
| NBR① | 41 | | | | | |
| NBR② | | 34 | 28 | 50 | | |
| NBR④ | | | | | 50 | 40 |

TABLE 2-continued

|  | Example | | | | Comparative example | |
|---|---|---|---|---|---|---|
|  | 1 | 2 | 3 | 4 | 1 | 2 |
| Brominated EPDM | 59 | 66 | 72 | 50 | 50 | 60 |
| HAF carbon black | 60 | 60 | 60 | 60 | 60 | 60 |
| Naphthene-based oil | 10 | 10 | 10 | 10 | 10 | 10 |
| Dioctylphthalate | 15 | 15 | 15 | 15 | 15 | 15 |
| Zinc oxide | 5 | 5 | 5 | 5 | 5 | 5 |
| Stearic acid | 1 | 1 | 1 | 1 | 1 | 1 |
| Vulcanization accelerator | | | | | | |
| CBS | 1.5 | 1.5 | 1.5 | 1.5 | 1.5 | 1.5 |
| MBT | 0.4 | 0.4 | 0.4 | 0.4 | 0.4 | 0.4 |
| Sulfur | 1.5 | 1.5 | 1.5 | 1.5 | 1.5 | 1.5 |
| Characterization | | | | | | |
| Tensile strength (MPa) | 17 | 18 | 24 | 21 | 17 | 19 |
| Elongation (%) | 300 | 320 | 320 | 300 | 410 | 360 |
| Heat resistance (hardness change point) | +9 | +8 | +7 | +10 | +13 | +10 |
| Oil resistance (volume change) (%) | +79 | +77 | +90 | +43 | +81 | +95 |
| Weather resistance | | | | | | |
| 100 hours | No crack | No crack | No crack | No crack | Break | Crack |
| 200 hours | No crack | No crack | No crack | Crack | Break | Break |

TABLE 3

|  | Example | | | | | | Comparative example |
|---|---|---|---|---|---|---|---|
|  | 5 | 6 | 7 | 8 | 9 | 10 | 3 |
| Raw material (wt %) | | | | | | | |
| Rubber component | | | | | | | |
| NBR① | 80 |  |  | 80 | 100 |  |  |
| NBR② |  | 80 |  |  |  | 100 |  |
| NBR③ | 20 | 20 | 20 |  |  |  |  |
| NBR④ |  |  | 80 |  |  |  | 100 |
| NBR⑤ |  |  |  | 20 |  |  |  |
| FEF carbon black | 30 | 30 | 30 | 30 | 30 | 30 | 30 |
| Zinc oxide | 3 | 3 | 3 | 3 | 3 | 3 | 3 |
| Stearic acid | 1 | 1 | 1 | 1 | 1 | 1 | 1 |
| Vulcanization accelerator | | | | | | | |
| CBS | 1.5 | 1.5 | 1.5 | 1.5 | 1.5 | 1.5 | 1.5 |
| Sulfur | 0.5 | 0.5 | 0.5 | 0.5 | 0.5 | 0.5 | 0.5 |
| Characterization | | | | | | | |
| Average content of bound acrylonitrile of total of rubber component (wt %) | 61 | 70 | 52 | 59 | 61 | 72 | 50 |
| Tensile strength (MPa) | 25 | 34 | 22 | 23 | 23 | 31 | 20 |
| Elongation (%) | 510 | 400 | 630 | 490 | 420 | 340 | 530 |
| Hardness | 47 | 59 | 29 | 44 | 65 | 92 | 33 |
| Index of gas barrier performance | | | | | | | |
| air | 107 | 108 | 102 | 106 | 107 | 109 | 100 |
| nitrogen gas | 108 | 109 | 102 | 106 | 107 | 110 | 100 |
| oxygen gas | 106 | 106 | 101 | 104 | 105 | 108 | 100 |
| Fuel C | 145 | 235 | 103 | 136 | 148 | 397 | 100 |

Based on the results shown in Table 2, each of the rubber compositions of Examples 1 to 4 exhibited an excellent processability, and gave a vulcanized rubber whose physical characteristics were well-balanced. On the other hand, Comparative 1 employing an NBR having the bound acrylonitrile content as low as 50 wt % exhibited an insufficient heat resistance and a substantially deteriorated weather resistance, revealing a poorly-balanced physical characteristics. In addition, Comparative 2 employing an NBR whose bound acrylonitrile content was similarly low and which was contained only in a small amount exhibited a marked reduction in the oil resistance, although the weather resistance was somewhat recovered.

Based on the results shown in Table 3, each vulcanized rubber made from each of the rubber compositions of Examples 5 to 8 exhibited sufficient strength and elongation and had a low permeability for each gas and a low hardness, revealing that it had excellent mechanical strength and gas barrier performance in combination with a flexibility. Although each of Examples 9 and 10 had a substantial hardness and was not flexible, it showed a gas permeability which was extremely low for each gas when compared with Comparative 3, revealing that it was excellent especially in terms of the gas barrier performance. On the other hand, Comparative 3 employing only an NBR-typed rubber having the bound acrylonitrile content as low as 50 wt % exhibited a poor gas barrier performance, although it was flexible.

What is claimed is:

1. An unsaturated nitrile-conjugated diene-based rubber comprising 55 to 80 wt % of (A) an olefinically unsaturated nitrile monomer unit as a repeating unit and 20 to 45 wt % of (B) a conjugated diene monomer unit as a repeating unit based on 100 wt % of total of said monomer unit (A) and said monomer unit (B), and whose glass transition temperature of said unsaturated nitrile-conjugated diene-based rubber is −15 to 30° C., wherein weight-average molecular weight of said unsaturated nitrile-conjugated diene-based rubber is 30,000 or more.

2. The unsaturated nitrile-conjugated diene-based rubber according to claim 1 wherein the content of said monomer unit (A) is exceeding 60 wt %.

3. A process for the production of an unsaturated nitrile-conjugated diene-based rubber which is constituted of 55 to 80 wt % of (A) an olefinically unsaturated nitrile monomer unit as a repeating unit and 20 to 45 wt % of (B) a conjugated diene monomer unit as a repeating unit based on 100 wt % of total of said monomer unit (A) and said monomer unit (B), and whose glass transition temperature of said unsaturated nitrile-conjugated diene-based rubber is −15 to 30° C., comprising:

a first step for polymerizing using (a) an olefinically unsaturated nitrile monomer in an amount of 60 to 85 wt % and (b) a conjugated diene monomer in an amount of 3 to 10 wt % based on 100 wt % of total of said monomer (a) and said monomer (b) to be supplied, a second step for continuing polymerization by supplying continuously said monomer (b) in an amount of 50 wt % or more and said monomer (a) in an amount of 50 wt % or less based on 100 wt % of total of remainder of monomers.

4. A process for the production of an unsaturated nitrile-conjugated diene-based rubber which is constituted of 55 to 80 wt % of (A) an olefinically unsaturated nitrile monomer unit as a repeating unit and 20 to 45 wt % of (B) a conjugated diene monomer unit as a repeating unit based on 100 wt % of total of said monomer unit (A) and said monomer unit (B), and whose glass transition temperature of said unsaturated nitrile-conjugated diene-based rubber is −15 to 30° C., comprising:

a first step for polymerizing using (a) an olefinically unsaturated nitrile monomer in an amount of 60 to 85 wt % and (b) a conjugated diene monomer in an amount of 3 to 10 wt % based on 100 wt % of total of said monomer (a) and said monomer (b) to be supplied, a second step for continuing polymerization by supplying total of remainder of monomers stepwise by said monomer (b) in an amount of 50 wt % or more and said monomer (a) in an amount of 50 wt % or less based on 100 wt % of monomers to be supplied in each step.

5. A rubber composition comprising two kinds of unsaturated nitrile-conjugated diene-based rubbers which are constituted of 55 to 80 wt % of (A) an olefinically unsaturated nitrile monomer unit as a repeating unit and 20 to 45 wt % of (B) a conjugated diene monomer unit as a repeating unit based on 100 wt % of total of said monomer unit (A) and said monomer unit (B), whose glass transition temperature of said unsaturated nitrile-conjugated diene-based rubbers are −15 to 30° C., and one of which is a high molecular weight rubber whose weight-average molecular weight is 30,000 or more and the other of which is a low molecular weight rubber whose weight-average molecular weight is less than 30,000.

6. The rubber composition according to claim 5 further comprising at least one of reinforcing agents selected from the group consisting of silica, aluminium hydroxide and carbon black.

7. The rubber composition according to claim 5 wherein said high molecular weight rubber is in an amount of 40 to 95 wt % and said low molecular weight rubber is in an amount of 5 to 60 wt % based on 100 wt % of the total of said high molecular weight rubber and said low molecular weight rubber.

8. The rubber composition according to claim 7 wherein said weight-average molecular weight of said high molecular weight rubber is 50,000 to 700,000 and said weight-average molecular weight of said low molecular weight rubber is 1,000 to 20,000.

9. The rubber composition according to claim 8 further comprising at least one of reinforcing agents selected from the group consisting of silica, aluminium hydroxide and carbon black.

10. The rubber composition according to claim 5 wherein the content of said olefinically unsaturated nitrile monomer unit (A) is 40 to 80 wt % based on 100 wt % of total of rubber components contained in said rubber composition.

11. The rubber composition according to claim 10 further comprising at least one of reinforcing agents selected from the group consisting of silica, aluminium hydroxide and carbon black.

12. A process for the production of rubber composition comprising:

a first step of preparing a kneaded material by kneading a formulation (I) containing an unsaturated nitrile-conjugated diene-based rubber which is constituted of 55 to 80 wt % of (A) an olefinically unsaturated nitrile monomer unit as a repeating unit and 20 to 45 wt % of (B) a conjugated diene monomer unit as a repeating unit based on 100 wt % of total of said monomer unit (A) and said monomer unit (B), whose glass transition temperature of said unsaturated nitrile-conjugated diene-based rubber is −15 to 30° C., and a second step for kneading a formulation (II) containing said kneaded material and a vulcanizing agent, wherein said unsaturated nitrile-conjugated diene-based rubber are the ones which are a high molecular weight rubber whose weight-average molecular weight is 30,000 or more and a low molecular weight rubber whose weight-average molecular weight is less than 30,000.

* * * * *